(12) United States Patent
Landriani et al.

(10) Patent No.: US 6,375,331 B1
(45) Date of Patent: Apr. 23, 2002

(54) PROTECTION DEVICE FOR TRANSPARENCIES FOR OVERHEAD PROJECTORS

(75) Inventors: Laura Landriani, Caserta; Giuseppe Giacobone, Capua; Concetta Capezzuto, Portici, all of (IT)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/380,454

(22) PCT Filed: Feb. 25, 1998

(86) PCT No.: PCT/IT98/00039

§ 371 Date: Sep. 2, 1999

§ 102(e) Date: Sep. 2, 1999

(87) PCT Pub. No.: WO99/44098

PCT Pub. Date: Sep. 2, 1999

(51) Int. Cl.[7] .............................................. G03B 21/14
(52) U.S. Cl. ..................... 353/120; 40/701; 428/206
(58) Field of Search ........................... 353/120, DIG. 5; 40/701; 428/206

(56) References Cited

U.S. PATENT DOCUMENTS

| | | | |
|---|---|---|---|
| 3,618,752 A | 11/1971 | Barker et al. ................. | 206/57 |
| 4,105,292 A | * 8/1978 | Conder et al. | |
| 4,402,585 A | 9/1983 | Gardlund ..................... | 353/120 |
| 5,266,987 A | * 11/1993 | Kiehne et al. ............... | 353/120 |
| 5,310,591 A | 5/1994 | Dodge et al. ................ | 428/195 |
| 5,319,400 A | * 6/1994 | Herbert et al. ............... | 353/120 |
| 5,335,027 A | * 8/1994 | Lin et al. ..................... | 353/120 |
| 5,709,926 A | 1/1998 | Gust ........................... | 428/206 |

* cited by examiner

Primary Examiner—William Dowling
(74) Attorney, Agent, or Firm—Yen Tong Florczak; Nestor F. Ho

(57) ABSTRACT

A transparency protection device for protecting a transparency sheet, the protection device including a protective sheet and a presentation flap generally coupled to the protective sheet. The protective sheet includes a generally transparent film having a first major surface and a second major surface, the first surface positioned to be in contact with the transparency sheet. At least a portion of the first major surface includes a plurality of integral micromounds protruding from the major surface. The protective sheet is microtextured bi-axially oriented polypropylene having a micromound density in the range of 100 to 300 micromounds per square millimeter, the micromounds have a major axis length of 20 to 60 microns.

11 Claims, 4 Drawing Sheets

PROTECTION DEVICE FOR TRANSPARENCIES FOR OVERHEAD PROJECTORS

This Application claims priority from PCT/IT98/00039, filed Feb. 25, 1998.

BACKGROUND OF THE INVENTION

1. Field of the Invention

The present invention relates to an envelope for transparencies for overhead projectors and the like. More specifically, the present invention is a transparency envelope having a transparency contact surface including a plurality of integral micromounds. The envelope of the present invention offers superior optical performance by reducing or eliminating Newton's rings, interference fringes and visible oil pooling effects, as well as offering desirable clarity, weight and appearance.

2. Description of the Prior Art

The use of overhead projectors and the transparencies associated therewith has been amply documented. The use and display of graphics and text in business presentations, lectures and the like often augments the effectiveness of the speaker and of the presentation. Transparencies, bearing graphics and/or text, are often exhibited to the viewers on a screen using an overhead projector. Transparencies allow the presenter to preview the presentation, easily sort through materials, point out specific features, and easily add additional comments or graphics. Newer transparency designs offer compatibility with printing devices, and thus may be printed without the need of specialized equipment.

However, individual transparencies are delicate. The transparent film, coatings and inks may be easily damaged in storage or transit. Also, dirt and dust may deposit over the image. Any blemishes to the image are, by the very nature of the medium, amplified and highlighted during a presentation.

Storage and projection accessories have been developed to protect the transparencies. A variety of transparency protection devices such as protective envelopes, frames, cover sheets, transparency assemblies and the like that contain or overlay the transparency have been developed. A number of such protective accessories include transparent sheets of material, which are placed directly against the surface of the transparency. Industry practice has been to use both polyvinylchloride (PVC) and polyethyleneterephthalate (PET) in the manufacture of the transparent sheets. Polypropylene and cellulose acetate, have been suggested for the same purpose.

Certain problems have arisen with the use of imaged film sheets inserted in transparent film envelopes, among them the appearance of Newton's rings, interference fringes, and oil pooling.

Newton's rings and interference fringes are optical phenomena observed when two sheets approach close to one another, and the small air gap between the sheets has a different refractive index from that of the sheet materials. The phenomena are better observed when one or both of the sheets is transparent and are due to the wave nature of light. Detailed explanations of the theory of the phenomena may be found in, for example, Warren J. Smith, *Modern Optical Engineering*, p. 14 (McGraw-Hill, 2nd ed. 1990), and in Francis Arthur Jenkins, *Fundamentals of Optics*, §14.4, p. 294 (McGraw-Hill 1976).

Newton's rings are evidenced when two surfaces touch locally, the point of contact being surrounded by a series of rings whose widths increase with distance from the point of contact. In appearance, Newton's rings consist of concentric contour bands exhibiting, in white light, a change in color across the band. In monochromatic light, these concentric contour bands are uniform in color, but graded in intensity across the band.

Interference fringes are similar in origin to Newton's rings, but are observed when two surfaces make contact along a line. In white light a series of colors bands may be observed approximately parallel to the line of contact. In presentations, Newton's rings and interference fringes formed between a protective sheet and a transparency may be obtrusive and undesirable.

Oil pooling is a consequence of the use in certain copying or printing equipment of so-called silicone oils. As the desire for faster copiers has arisen, the need has been met by raising the operating temperature of fuser rolls. The application of a higher temperature for a shorter period of time has enabled copier speeds to rise. In addition certain color copiers require extreme fusing conditions to produce adequate color transparency. Problems have been encountered with toners or sheets adhering to the fuser rolls, and perhaps causing a serious breakdown of the copier. To reduce adhesion of the film and or toner to the fuser roll, copiers have been designed that provide a thin film of silicone oil on the surface of the fuser roll.

A certain amount of the oil remains on the film surface and results in somewhat unpleasant handling characteristics. Handling of the transparency may be reduced by placing the transparency in a film envelope. However, a detrimental side effect arises in that the residual oil is present in a sufficient amount to wet both the film envelope and the transparency, and flow to form localized concentrations of oil into a film of oil. The resulting oil pooling film has noticeable refractive properties and is considered objectionable and obtrusive on a projected image.

Particulates have been added to imageable coatings to alleviate oil pooling effects. However when particulate of a sufficient concentration and particle size is incorporated to eliminate the oil pooling problem, the particles are visible and cause unacceptable haze.

The need remains for protective sheets that eliminate or reduce Newton's rings, fringe interference and oil pooling.

SUMMARY OF THE INVENTION

The present invention is directed to a protective sheet and to transparency protection devices that reduce or eliminate Newton rings, interference fringes, and oil pooling effects without adding significant additional weight and while improving the overall appearance of the transparency packages. A film envelope for protecting a transparency, in accordance with the present invention includes a substantially rectangular pocket having at least one generally transparent sheet. The sheet comprises a film having a first and a second major surface, wherein at least a portion of one major surface includes a plurality of micromounds protruding from the major surface.

In one embodiment, the sheets comprise micro-textured bi-axially oriented polypropylene. In an alternative embodiment, the portion of the major surface including a plurality of micromounds comprises a micro-textured surface having a particulate and a multilayer film material. An additional anti-scratch surface coating may be applied to at least a portion of one of the major surfaces.

The micromounds have a height ranging between 1 to 10 microns, a micromound density in the range of 10 to 500 micromounds per square millimeter, and a major axis length in the range of 5 to 100 microns.

In a preferred embodiment, the micromounds have a height ranging between 2 to 5 microns, a micromound density in the range of 100 to 300 micromounds per square millimeter, and a major axis length in the range of 20 to 60 microns.

The envelope may further comprise one or more flaps, perforation holes, frames or other transparency protection, storage, and presentation elements known in the art.

DETAILED DESCRIPTION OF THE INVENTION

Figure 1:
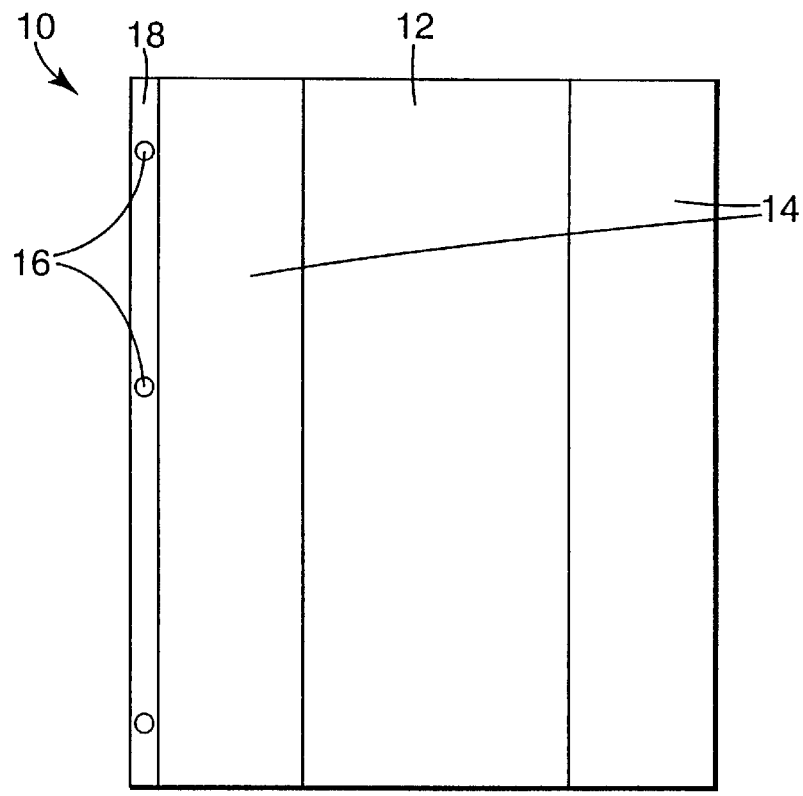
FIG. 1 is a plan view of a film transparency envelope in accordance with the present invention.

A transparency protection device in accordance with the present invention, a film envelope 10, is illustrated in FIG. 1. The envelope 10 includes two protection sheets 12, joined together along one or more side edges, such as by thermal welding, adhesive, adhesive tape or other methods known in the art, to form a substantially rectangular pocket 14. The envelope 10 is open along at least one side edge to allow the insertion of a transparency. In a currently preferred embodiment, the protective sheet 12 is generally transparent, although opaque, colored or frosted protective sheets or sheets including legends, labels, patterns, backgrounds or logos are contemplated within the scope of the present invention.

At least one flap 14 is attached in a foldable or hingeable manner along or proximal to one or more of the longitudinal side edges of the envelope 10. The flap 14 may be opaque (such as to limit or block projected light), frosted, colored, or transparent and may include patterns, designs or text. A preferred flap comprises opaque light-weight cardboard stock. The flap 14 is attached to and spaced a distance from the longitudinal edge such that holes 16 may be punched in a storage strip 18 of sheet material along the longitudinal edge between the flap and the edge. In the unfolded position, the flap 14 covers the storage strip 18 along the longitudinal side edge and in the folded position it exposes the storage strip 18 and the holes 16 to permit storage in a binder, file or the like. Those skilled in the art will recognize that a variety of arrangements are possible, including flaps on the lateral edges, overlapping or abutting flaps, and different storage features.

Figure 2:
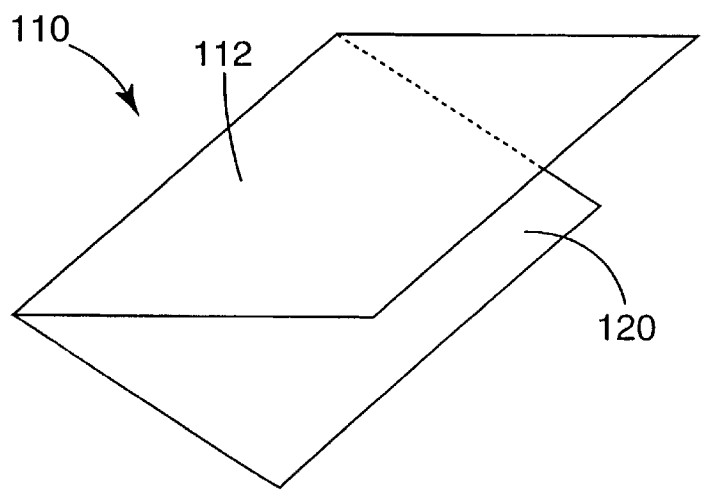
FIG. 2 is a perspective view of a second transparency protection device in accordance with the present invention.

FIG. 2 illustrates a second transparency protection device, a transparency assembly 110, in accordance with the present invention. The transparency assembly 110 includes an imageable sheet 120 and a generally transparent protective sheet 112. The protective sheet 112 overlays the imageable sheet 120 and may be coupled by attachment means such as an adhesive. Alternative embodiments may include presentation flaps, and a storage strip having storage perforations.

Figure 3:
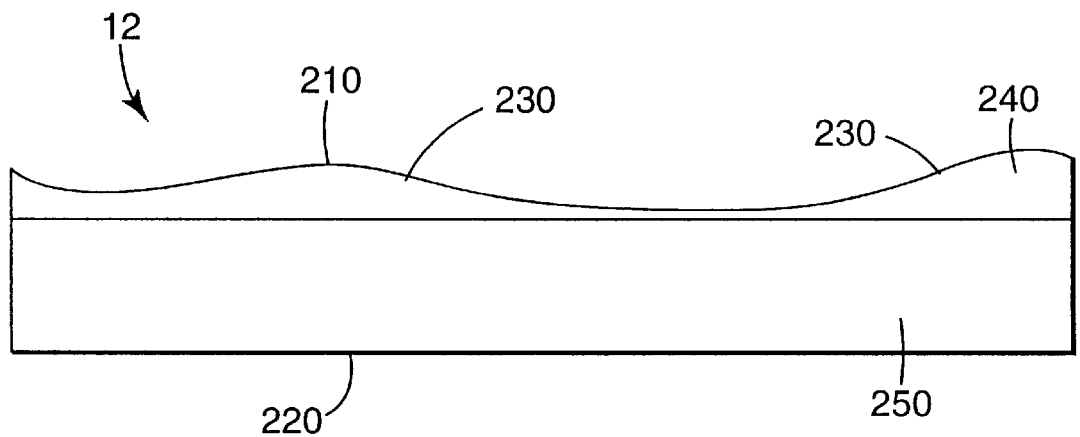
FIG. 3 is an enlarged side elevation of an alternative transparent sheet in accordance with the present invention.
Figure 5:
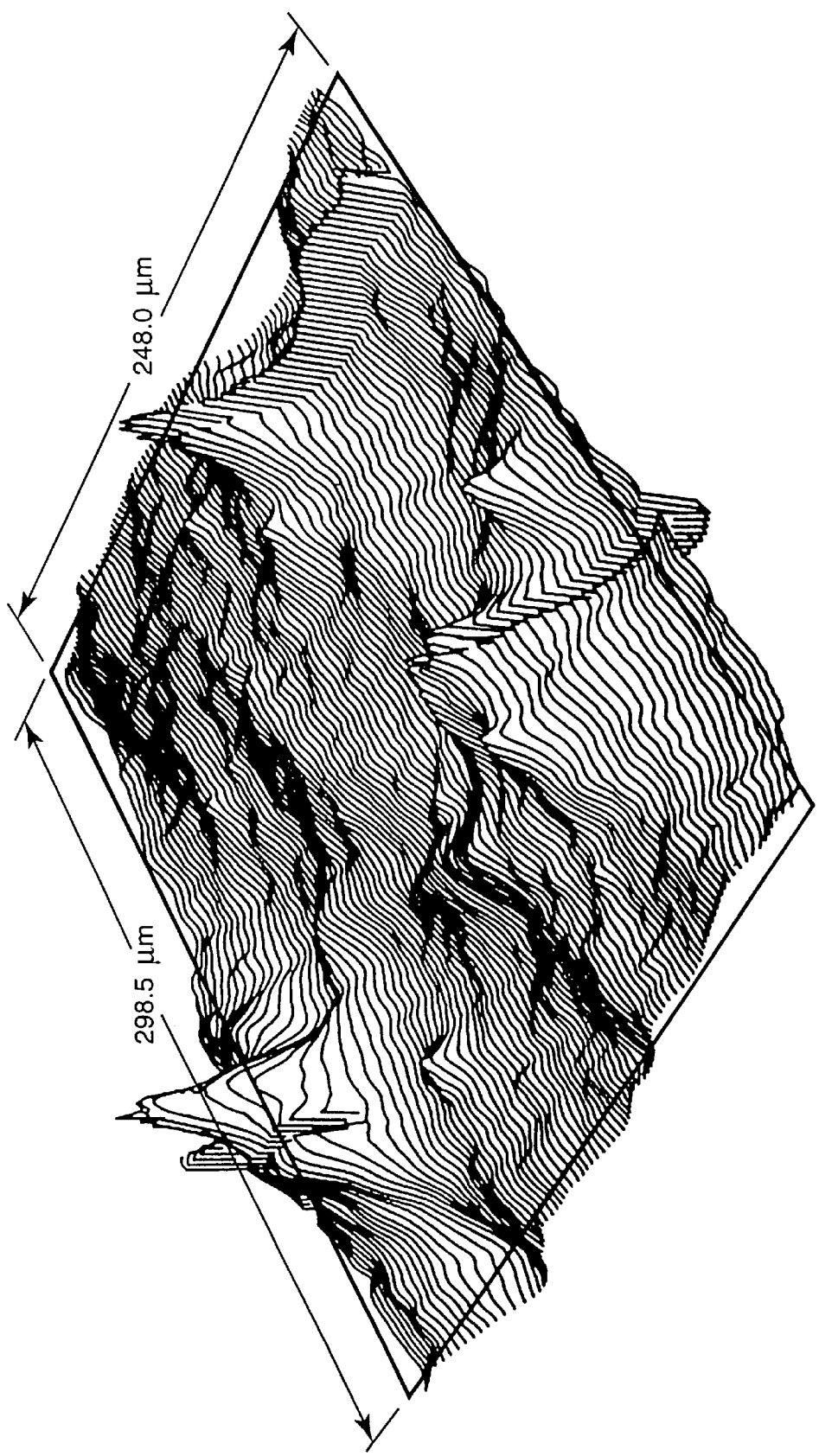
FIG. 5 is a plan view of a microscopic enlargement of the transparent sheet illustrated in FIG. 3.

Both the transparency protection devices 10 and 110 include similar transparent protective sheets, 12 and 112 respectively, in accordance with the present invention. FIG. 3 and FIG. 5 illustrate the transparent protective sheet 12. The transparent protective sheet 12 is generally colorless in a preferred embodiment, but may also be colored or patterned. Different colors, logos, and patterns may be used, for example, to identify different users, to provide a background for a presentation, to introduce legends, or merely for aesthetic reasons. Color may be introduced through printing, coating, or as part of the film making process. The protective sheet 12 also may have borders such as a thin line or a white strip, coextensive or proximal to the side edges. An edge may be printed directly onto the protective sheet or may be a separate element coupled by fasteners, adhesive, or other attachment methods.

FIG. 3 illustrates a much enlarged side elevation view of the transparent to protective sheet 12 of the transparency protection device 12. The transparent protection sheet 12 has a transparency-facing first major surface 210 and a second major surface 220.

At least a portion of the first major surface 210, the surface to be in contact with the transparency film, includes a plurality of randomly distributed micromounds 230 protruding from the first major surface. Micromounds may be placed only in selected transparency contact portions or patterns or on the entire surface of the protection sheet 12. In one embodiment, the sheets comprise micro-textured biaxially oriented polypropylene (BOPP). In an alternative embodiment, the portion of the first major surface including a plurality of micromounds comprises a microtextured surface having a multilayer particulate-containing film material. An additional anti-scratch surface coating may be applied to at least a portion of one of the major surfaces. Alternative embodiments may include PET, cellulose acetate, CAB, and PEN.

The transparent sheet 12 may be achieved by printing a thick pattern of a coating film 240 on a transparent substrate 250 using any suitable printing process, such as lithography, gravure, or screen printing. The pattern and thickness of the coating film 240 is selected to match the desired micromound distribution and size. The coating film 240 may be colorless and may be thermally or UV-radiation cured.

Multilayer, micromound particulate-containing films may be made by co-extrusion and orientation methods. Small particulates are placed between layer boundaries and act as "seeds" to produce larger micromounds. In one exemplary method, a three-layer composition is extruded from a casting die, the two outer layers being thin and containing particulates. A particulate having a mean diameter similar to that of the layer thickness is desirable. The orientation process takes place in two steps, the first stretches the film in a down-web direction ("drawing"), and can reduced the total film thickness by a factor of four. The second step stretches the film in a cross-web direction, ("tentering"), and can reduce the film thickness by a similar factor. Naturally, there are limits to the total stretching ratios that may be achieved. However during the drawing and tentering processes there is no corresponding reduction in the particle size, resulting in a final film where the particles tend to act as core seeds to produce integral micromounds that protrude from the surface of the outer layers. The layers radially cover the particulates and create resulting radially larger micromounds, thus allowing the use of smaller particulates that do not cause the obtrusive haze that may have resulted from surface particulates equal in size of the micromounds.

A second variant of this process, involves extruding the molten polymers through concentric circular dies, of relatively small diameter, producing a tube of polymer. The film is then stretched by maintaining the interior region of the (tubular) film at a pressure higher than ambient. The tube of polymer then forms a bubble that is of considerably larger diameter than that of the circular dies (corresponding to the tentering operation), and it is drawn also by accelerating the tube of film as it is expanded. Finally the film is cooled and driven through nip rollers for wind-up and storage. The second method appears to perform best with certain polymers (e.g., polyethylene and polypropylene). Both methods are capable of producing high quality film containing protruding particulate-seeded micromounds.

Micromounds are defined as integral microscopic elevated regions, protrusions, or mounds on the surface of the material. The micromounds are invisible to the naked eye and do not cause obtrusive haze or a significant reduction in clarity. The micromounds act as spacers between the surface of the transparent sheet and the surface of the transparency to increase the air gap between the two. The higher air gap helps to significantly reduce or eliminate Newton's rings and interference fringes. Similarly, the increased separation between the surfaces of the transparency and the protective sheet reduce oil pooling by reducing contact areas where the silicone oil may concentrate and create a film by wetting both surfaces.

An unexpected result presented by the present invention is that, in contrast with coatings having surface particulates, micromounds on the film surface do not noticeably interfere with light transmission. Previous coatings using surface particulates were able to reduce Newton's rings, oil pooling and interference fringes to some extent, however, the size of the surface particulates and the high loading concentration (the number of large particles per unit area needed), caused an unacceptable haze visible on projection. The micromound material has improved or equivalent haze to an uncoated polyester sheet, and is able to reduce or prevent all the three defects.

The micromounds have a height ranging between 1 to 10 microns and a major axis length in the range of 5 to 100 microns. Micromound density ranges from 10 to 500 micromounds per square millimeter. A currently preferred embodiment of the present invention has a micromound height ranging between 2 to 5 microns, a micromound density in the range of 100 to 300 micromounds per square millimeter, and a micromound major axis length in the range of 20 to 60 microns. In a currently preferred embodiment, the micromounds are integral with the surface material and the sides of the micromounds exhibit a gradual slope. The lower refractive index of the constant material and the reduction of major deviation of the incident light beams are believed to reduce haze. A regular pattern, that is, periodically repeating uniform micromound distribution, is not necessary to practice the present invention.

Figure 4:
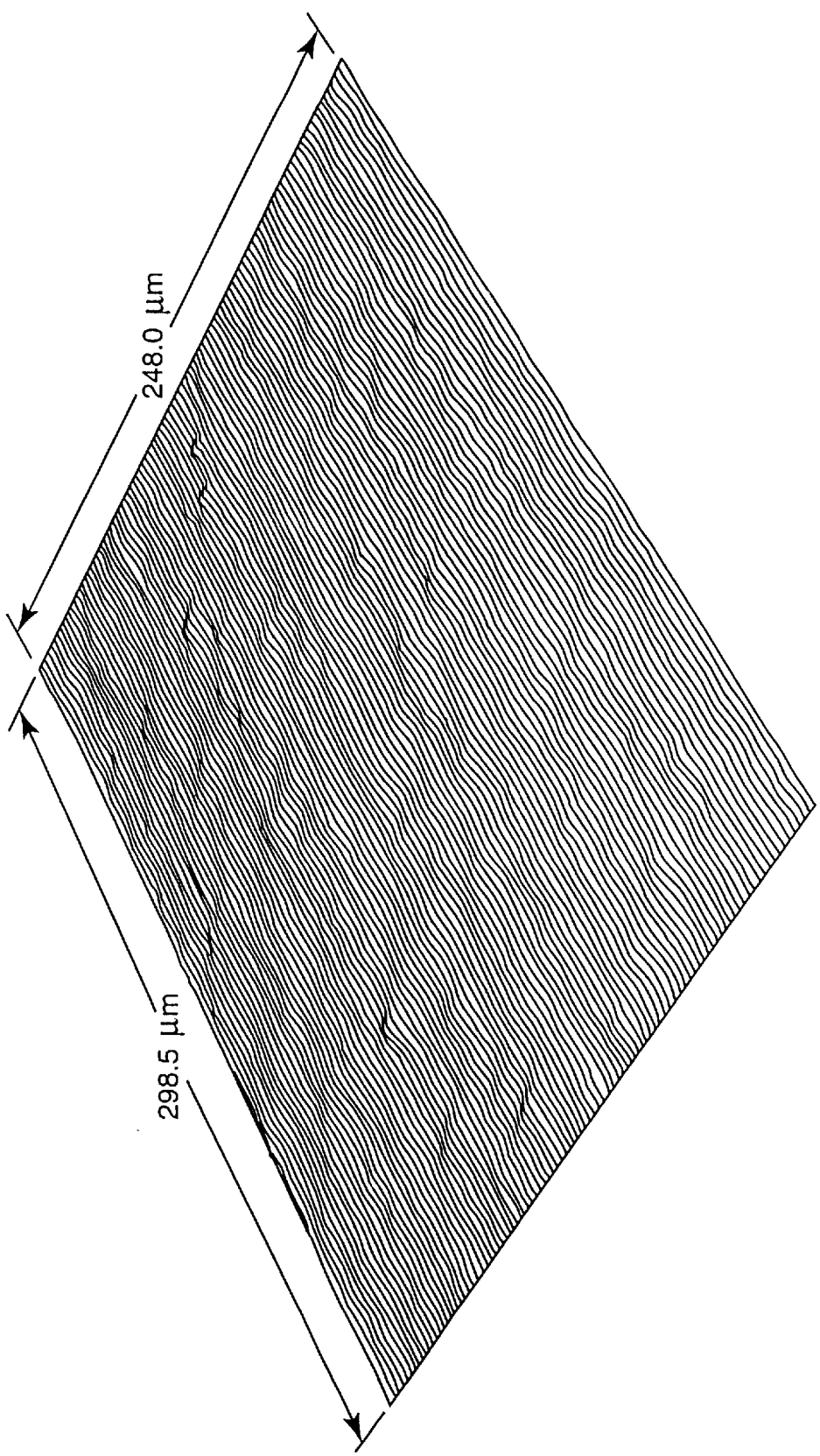
FIG. 4 is a perspective view of a microscopic enlargement of a transparent sheet without micromounds.

FIG. 4 illustrates a microscopic analysis of a sheet without micromounds. FIG. 5 illustrates a microscopic analysis of the transparent sheet 12 illustrated in FIG. 3. The vertical axis of FIGS. 4 and 5 is exaggerated for illustrative purposes. The sheet 12 has a relatively smooth surface having several protruding micromounds randomly distributed. An additional anti-scratch surface coating is applied to at least a portion of one of the major surfaces.

Alternative methods of manufacturing a transparent sheet in accordance with the present invention include a droplet spray process or embossing the film in a suitably engraved nip roll pair.

Those skilled in the art will appreciate that a plurality of other methods may be applied to create transparent sheets having micromounds in accordance with the present invention.

EXAMPLES

Two transparency protection devices were compared. The control transparency protection device was made from bi-axially oriented polyethyleneterephthalate (PET) without micromounds, as illustrated in FIG. 4. The experimental Transparency protection device was made of a micro-textured biaxially oriented polypropylene (BOPP) having micromounds, as illustrated in FIG. 5. The two transparency protection devices were then placed on an overhead projector and examined. The results are summarized as follows:
BOPP/PET Evaluation:
Product Performances Comparison

| Parameter | BOPP | PET | BOPP vs. PET |
|---|---|---|---|
| Haze (%) | 1.5 | 2.3 | + |
| Transmittance (%) | 98 | 88 | + |
| Yellowness Index (YID) | 0.3–1.0 | 8.6 | + |
| Holes Strength (Kg) | 1.9 | 3.9 | – |
| Adhesive transfer | OK | OK | = |
| Peel adhesion (g) | 157 | 125 | + |
| Welding Strength (g) | 716 | 517 | + |
| Stiffness (mm) | 65 | 67 | = |
| Newton rings | No | Yes | + |
| Weight (g/FF) | 8.3 | 10.6 | + |

The PET transparency protection device without micromounds showed numerous and obtrusive Newton's Rings, while the transparency protection device having micromounds showed none.

An imaged sheet of ink jet transparency film was then placed in each of the transparency protection devices, and each combination viewed as above. Ink jet film usually has, on one side, an ink receptive coating containing protruding particulate, which will to some extent inhibit the formation of Newton's Rings, but that the other side of the ink jet sheet is normally uncoated film base.

The ink jet film in the transparency protection device without micromounds showed Newton's Rings between the back surface of the ink jet film and the material of the transparency protection device. No Newton's Rings were observed in the example of the ink jet film in the BOPP transparency protection device.

Overhead transparencies known to have high surface concentrations of silicone oil were placed then in the transparency protection devices. After allowing a few minutes for possible oil pooling to occur, the two samples were viewed side by side on the stage of an overhead projector. The image defect known as oil pooling was present in the PET transparency protection device, but was very much reduced in the micromound BOPP transparency protection device.

The transparent sheet material of the present invention also offers additional advantages. The textured BOPP material is more cost efficient to produce and shows improved clarity when projected, due to higher light transmission and lower haze than traditional products. The BOPP material has an attractive silver appearance when stacked in a box, in comparison with the yellowish tint found in traditional materials. In addition, the BOPP material has a lower density than traditional PET material, about 22%. The reduction in weight of the individual transparency protection devices translates into a significant difference in convenience for a presenter traveling with a typical multi-transparency presentation.

Transparency protection devices in accordance with the present invention also offer other additional advantages.

First, the micromounds reduce surface adhesion caused by oil-pooling, allowing easier placement and removal of the transparency. Second, the micromounds reduce the oil residue left on the surface of the transparency protection device, thus allowing reusability.

The embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. A film envelope for protecting a transparency, the envelope comprising:

a pocket sized to receive the transparency, the pocket having at least one protective sheet, the protective sheet comprising a film having a first and a second major surface, wherein at least a portion of the first major surface includes a plurality of integral protruding micromounds having a major axis length in the range of 5 to 100 microns.

2. A film envelope for protecting a transparency, the envelope comprising:

a pocket sized to receive the transparency, the pocket having at least one protective sheet, the protective sheet comprising a film having a first and a second major surface, wherein at least a portion of the first major surface includes a plurality of integral protruding micromounds having a height ranging between 2 to 5 microns.

3. A film envelope for protecting a transparency, the envelope comprising:

a pocket sized to receive the transparency, the pocket having at least one protective sheet, the protective sheet comprising a film having a first and a second major surface, wherein at least a portion of the first major surface includes a plurality of integral protruding micromounds having a major axis length in the range of 20 to 60 microns.

4. A transparency protection device for protecting a transparency, the protection device comprising:

a protective sheet for protecting a transparency, the sheet comprising:

a film having a transparency contacting first major surface and a second major surface, wherein at least a portion of the first major surface includes a plurality of integral micromounds protruding from the major surface, and wherein the micromounds have a major axis length in the range of 5 to 100 microns.

5. A transparency protection device for protecting a transparency, the protection device comprising:

a protective sheet for protecting a transparency, the sheet comprising:

a film having a transparency contacting first major surface and a second major surface, wherein at least a portion of the first major surface includes a plurality of integral micromounds protruding from the major surface, and wherein the micromounds have a height ranging between 2 to 5 microns.

6. A transparency protection device for protecting a transparency, the protection device comprising:

a protective sheet for protecting a transparency, the sheet comprising:

a film having a transparency contacting first major surface and a second major surface, wherein at least a portion of the first major surface includes a plurality of integral micromounds protruding from the major surface, and wherein the micromounds generally have a major axis length in the range of 20 to 60 microns.

7. A protective film for protecting a transparency assembly comprising:

a generally transparent material having a transparency facing first major surface and a second major surface, wherein at least a portion of the first major surface includes a plurality of integral micromounds protruding from the major surface, and wherein the transparent material is transparent micro-textured bi-axially oriented polypropylene having a micromound density in the range of 100 to 300 micromounds per square millimeter and having a major axis length of 20 to 60 microns.

8. A transparency protection device for protecting a transparency, the transparency protection device comprising:

a substantially rectangular pocket sized to receive the transparency, the pocket having at least one protective sheet, the protective sheet comprising a film having an inner major surface and an outer major surface, wherein at least a portion of the inner major surface includes a plurality of integral micromounds protruding from the major surface, the protective sheet comprising micro-textured bi-axially oriented polypropylene having a micromound density in the range of 100 to 300 micromounds per square millimeter and a micromound major axis length of 20 to 60 microns.

9. A film envelope for protecting a transparency, the envelope comprising:

a pocket sized to receive the transparency, the pocket having at least one protective sheet, the protective sheet comprising a film having a first and a second major surface, wherein at least a portion of the first major surface includes a plurality of integral protruding micromounds having a major axis length in the range of 5 to 100 microns and a height ranging between 2 to 5 microns.

10. A film envelope for protecting a transparency, the envelope comprising:

a pocket sized to receive the transparency, the pocket having at least one protective sheet, the protective sheet comprising a film having a first and a second major surface, wherein at least a portion of the first major surface includes a plurality of integral protruding micromounds having a major axis length in the range of 20 to 60 microns.

11. A protective film for protecting a transparency assembly comprising:

a generally transparent material having a transparency facing first major surface and a second major surface, wherein at least a portion of the first major surface includes a plurality of integral micromounds protruding from the major surface, the protective film comprising transparent micro-textured bi-axially oriented polypropylene having a micromound density in the range of 100 to 300 micromounds per square millimeter, wherein the micromounds have a major axis length of 20 to 60 microns.

* * * * *